United States Patent [19]

Jain

[11] 4,164,788
[45] Aug. 14, 1979

[54] SUPER-RESOLUTION IMAGING SYSTEM

[76] Inventor: Atul Jain, 1545 E. Mendocino Rd., Altadena, Calif. 91001

[21] Appl. No.: 731,986

[22] Filed: Oct. 13, 1976

[51] Int. Cl.² .................. G06G 7/19; G02B 27/10
[52] U.S. Cl. ............................. 364/515; 356/167; 358/166; 364/525; 364/576
[58] Field of Search ............ 235/151.3; 350/162 SF; 356/71, 167; 364/515, 576, 525; 358/166, 209, 214, 284, 294, 222

[56] References Cited

U.S. PATENT DOCUMENTS

| 3,627,920 | 12/1971 | Schroeder et al. | 358/222 |
| 3,937,580 | 2/1976 | Kasdan | 350/162 SF |
| 3,957,353 | 5/1976 | Fienup et al. | 350/162 SF |
| 3,969,017 | 7/1976 | Dammann | 350/162 SF |
| 4,013,338 | 3/1977 | Sato et al. | 350/162 SF |

OTHER PUBLICATIONS

Kartashev, A. I.; Optical Systems with Enhanced Resolving Power; Optics and Spectroscopy; vol. 9, No. 3, Sep. 1960.
Beard, T. D.; "Imaging by Correlation of Intensity Fluctuations", Applied Physics Letters; vol. 15, No. 7, 10/1/69.

Primary Examiner—Charles E. Atkinson
Assistant Examiner—Errol A. Krass
Attorney, Agent, or Firm—Freilich, Hornbaker, Wasserman, Rosen & Fernandez

[57] ABSTRACT

The resolution of an imaging system is greatly enhanced by radiating an object with a plane wave field from a coherent source variable in either frequency, angle or distance from the object, detecting the wave field transmitted through, or reflected from, the object at some point on the image of the object, with or without heterodyne detection, and with or without a lens system. The heterodyne detected output of the detector is processed to obtain the Fourier transform as a function of the variable for a direct measurement of the amplitude and surface height structure of the object within a resolution cell centered at the corresponding point on the object. In the case of no heterodyne detection, only intensity data is obtained for a Fourier spectrum.

30 Claims, 2 Drawing Figures

SUPER-RESOLUTION IMAGING SYSTEM

ORIGIN OF INVENTION

The invention described herein was made in the performance of work under a NASA contract and is subject to the provisions of Section 305 of the National Aeronautics and Space Act of 1958, Public law 85-568 (72 Stat. 435, 42 USC 2457).

BACKGROUND OF THE INVENTION

This invention relates to imaging systems, and more particularly to a method and apparatus for greatly improving the resolution of an imaging system.

High resolution for imaging systems is a problem due to the fact that the high frequency detail of the object diffracts the incident illumination to angles much greater than what the collecting aperture can gather. Because of that a considerable amount of information is lost in most imaging systems. Therefore, the finite size of the primary collector presents a fundamental limitation on the resolving power of any practical imaging system. Since the cost and the practical difficulties involved with building large aperture imaging systems increases with the size of this aperture, it has in the past been of great interest to find alternative means of obtaining a higher resolution with a small aperture. Since the case of an infinitely small collecting aperture is equivalent to the case of not having any imaging components, imaging or scanning of an object in such a case is also of great interest.

SUMMARY OF THE INVENTION

In a preferred embodiment of the invention, an object is radiated off axis (with or without a lens system) by a plane wave field from a coherent source at an angle, $\theta$, and the wave field, or intensity, of the wave field transmitted (or reflected) by the object is detected at some point in the image plane of the object while the spatial phase relationship of the radiating wave field is varied, either by varying the frequency, the angle or the distance of the object from the source. The wave field (amplitude and phase) or intensity (amplitude) detected is processed as a function of the variable to obtain the Fourier transform of the wave field to provide an enhanced image of the object itself along a line in the plane of the illuminating angle. Assuming that the angle, $\theta$, is in the X-Z plane, where the Z axis is in the direction to the object, the image thus produced is along the X axis. The position of the object relative to the imaging system can be moved in a direction normal to the plane of the angle, i.e, in the Y axis direction, and the process repeated for each new position to obtain a two dimensional image. In some applications it is easier, or perhaps only possible, to detect just the intensity of the wave field. Since the intensity is simply the absolute square of the wave field, the Fourier transform of the intensity with respect to the variable is the autocorrelation of the image wave field. Thus, while the Fourier transform of the intensity does not directly provide the super-resolution amplitude and phase structure of the imaged object, the autocorrelation function provides sufficient information to warrant direct measurement of intensity.

A description of the preferred embodiments will emphasize the case of a coherent light source, a fixed illumination angle, $\theta$, and a variable frequency, but it should be understood that the coherent source may be, for example, a source of ultrasonic waves, and that the frequency may be held constant while varying the angle. With off axis illumination in the X direction, the Fourier transform of the wave field with respect to the frequency (inverse wavelength) at a far field region point of an image plane yields an image of the object in the X dimension with a resolution factor related to the span of the frequency variation. Similarly, with a fixed wavelength and a variable angle of illumination, the Fourier transform of the wave field detected with respect to the angle of incidence yields an image of the object in the dimension of the angle variation with a resolution factor related to the span of the angle variation possible. When it is possible to use a combination of both angular and wavelength variation, one angle in the plane of one axis is set to be very large (e.g., $\theta_x = 30°$) while another angle in the plane of another orthogonal axis is varied over a small range (e.g., $\theta_y \pm \Delta\theta_y$). At the same time the frequency of coherent source is varied. A two-dimensionsl Fourier transform with respect to the frequency and angle variations yields an image of the object in two dimensions with a resolution factor related to the bandwidth of angular and frequency variation. It is also possible to use a combination of the angle variation in the two directions $\theta_x$, $\theta_y$ to provide a two-dimensional image. Another possibility is to vary the distance to the object along the Z axis instead of varying the frequency.

As used herein, the term "wave field" refers to both the amplitude and phase of the waves radiating from the source. In the case of electromagnetic radiation, such as for example radar, X-ray, or light as in the preferred embodiment to be described, the term "electric field" is equivalent to the generic term "wave field," and refers to both the phase and intensity of the radiation. The generic term wave field is intended to apply to other forms of coherent wave propagation, such as ultrasonic waves, for example.

DESCRIPTION OF PREFERRED EMBODIMENTS

Figure 1:
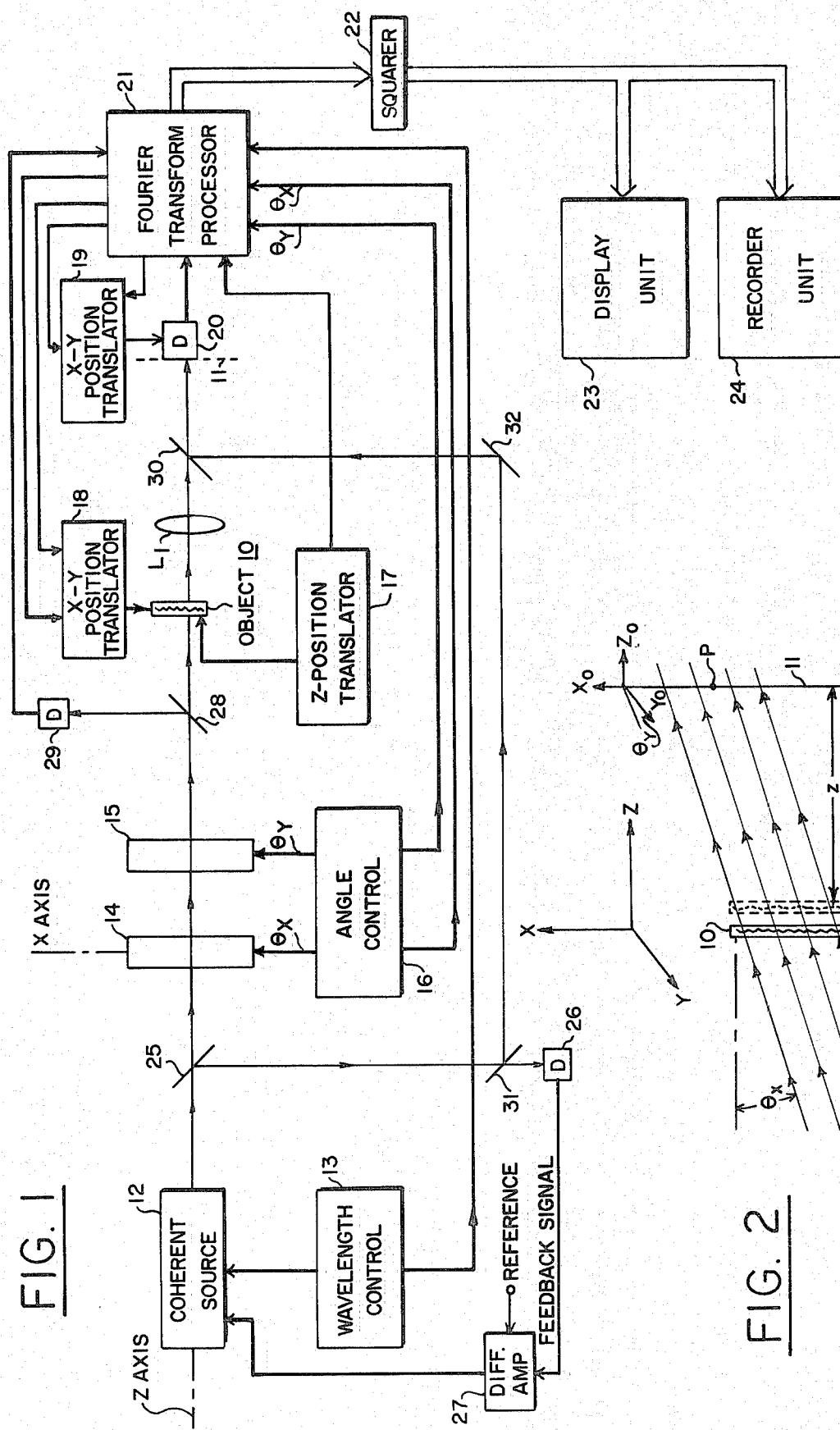
FIG. 1 is a block diagram of a system implemented to carry out the present invention in different modes of operation.

Referring now to the drawings, FIG. 1 illustrates the organization of a general, or universal, system for imaging an object 10 (with an optional lens $L_1$) onto a plane 11. The system is universal in that it provides a coherent source of radiation 12, such as a laser, of tunable wavelength under the control of a unit 13, and deflectors 14 and 15, such as rotatable prisms or electro-optic effect devices, for deflecting the illuminating beam in the respective X-Z and Y-Z planes under control of a unit 16. The Z axis is the axis of the beam in the direction of the object and the X axis is assumed to be in the plane of the drawings. The Y axis is then perpendicular to the plane of the paper. Imaging with super-resolution is thus possbile with either a variable radiation wavelength (frequency) or a variable angle of incidence of the radiation transmitted through the object 10, or with both a variable wavelength and angle, in which case one of the deflectors is set at a large angle (e.g., 30°) while the other is varied over a small angle of about 1°.

Figure 2:
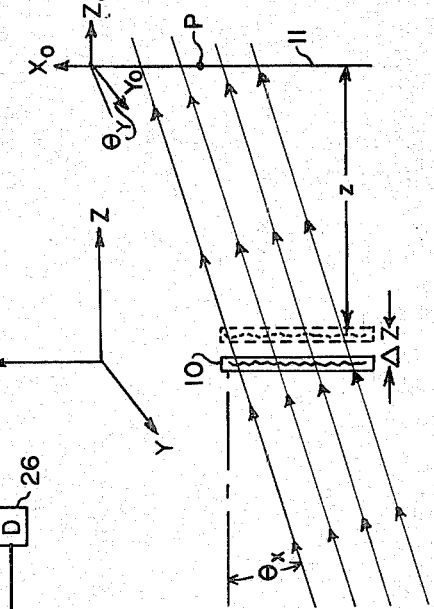
FIG. 2 is a diagram useful in understanding the principles of the invention.

An optional Z-position translator 17 is also provided to effectively phase modulate light transmitted through the object by varying the position of the object along the Z axis instead of varying the wavelength of the source 12. Modulation by varying the position of the object in the Z plane is fully equivalent to varying the angle or the wavelength at normal incidence, as may be better appreciated by reference to the diagram of FIG. 2 which shows the incident coherent light transmitted through the object 10 at an angle $\theta_x$ to the image plane 11 without the optional lens. FIG. 2 may also be used to better understand that when the direction of the incident light is normal to the object, the transmitted light must then be detected at the image plane off axis for super resolution.

The electric field at an image point P for the object 10 is the electric field transmitted (or reflected) by the object over the area of the corresponding resolution cell (determined by the resolving power of the imaging system) multiplied by the impulse response of the imaging system and integrated over this area. However, the electric field exiting the object depends upon the wavelength and angle of incidence as well as the phase (height in the Z axis) and amplitude (length in the X axis) structure of the object. Thus the value of the electric field at the image plane 11 varies with the wavelength or angle or incidence on the object.

Since moving the object (or the source) along the Z axis will vary the phase relationships of the incident light as detected at an off axis, far-field point, as can be seen from the diagram of FIG. 2, the value of the electric field at the image point varies with the position of the object along the Z axis. Consequently, the Fourier transform of this variation provides directly the amplitude and phase structure of the object within the resolution cell corresponding to the image point of interest.

It will, in most cases, be more convenient to vary the wavelength (represented by the space between wavefronts in FIG. 2) so that it is only necessary to set the deflectors 14 and 15, one for the desired offset angle of incidence (e.g., $\theta_x$), and the other to zero, or to set the wavelength of the source and vary the angle of incidence. Consequently, the Z position translator 17 can be omitted, as well as one of the angle deflectors 14 and 15, except for two dimensional imaging, in which case both deflectors are required. However, it is desirable to be able to move the object in order to image different areas. An X-Y position translator 18 is provided for that purpose.

It is also convenient to detect the electric field at different points in the image plane 11. An X-Y position translator 19 is provided to move a detector 20 in the image plane. All position translators provide a Fourier transform processor 21 with signals which uniquely identify the positions of the object 10 and detector 20, as well as the values of the variables, namely wavelength, and angles $\theta_x$ and $\theta_y$ in order for the Fourier transform to be computed by the processor 21, squared by a squarer 22, and the result displayed as an image in a unit 23 and/or recorded in a unit 24. Position data is recorded to provide stereo viewing of the object.

Since any variations in the intensity of the radiation source will result in variations in the electric field measurements made through the detector 20, it is necessary to maintain the intensity of the radiation substantially constant. That can be done by sampling the radiation using a beam splitter 25 and a detector 26 to provide a feedback signal to a differential amplifier 27 to so maintain the intensity of the radiation source that the difference between the feedback signal and a constant reference signal (voltage) is maintained at or very near zero. However, it is preferable to omit the detector 26 and differential amplifier 27, and to merely sample the radiation just in front of the object using a beam splitter 28 and a detector 29. The intensity of the radiation thus measured is then used in the Fourier transform processor 21 to normalize the measurements made through the detector 20. Any variation is intensity caused by the deflectors 14 and 15 will thus be compensated. However, it may be advantageous to provide both feedback control of the source and compensation in the processor.

With or without feedback control of the source, it is desirable to employ the beam splitter 25 to sample the radiation and transmit the sampled radiation to the detector 20 for heterodyne detection; alternatively an independent local oscillator synchronized with the light source for heterodyne detection. A beam splitter 30 may be employed to combine the sampled radiation with radiation from the object. Reflectors 31 and 32 direct the sampled radiation to the beam splitter 30. In the case of feedback control, the reflector 31 would be a beam splitter.

Before describing the operation of the system of FIG. 1 in different modes, the Fourier transform carried out in the processor 21 for high-resolution imaging will be described. Consider the geometry of FIG. 2 without a lens. A plane wave of a given wavelength is incident on the subject 10 at angles $\theta_x$, $\theta_y$ with respect to the direction to the object (Z axis). The amplitude transmittance of the object is assumed to be $a(x,y)$ and the transmitted radiation is detected at some point P in the far field region or the image plane of the object. Assuming a unit amplitude illumination, and using scalar diffraction theory in the following calculations, consider only the case of linear polarization.

The electric field, $E_o$, at the output plane of the object 10 is given by, $$E_o(x,y) = a(x,y)e^{i2kcos\theta_x cos\theta_y h(x,y)}e^{ik(xsin\theta_x + ysin\theta_y)} \quad (1)$$

where $h(x,y)$ is the surface phase transmittance profile of the object, and where the time dependent $e^{i\omega t}$ term has been suppressed for monochromatic illumination.

In the super-resolution imaging of an object, three possible arrangements are of interest. When an imaging system of pupil aperture function $P(x,y)$ is used and the impulse response is $\Psi(x,y)$, the image electric field is (for unit magnification)

$$E_i(x_o,y_o) = {_\infty}E_o(x,y)*\psi(x,y) \quad (2a)$$

where $\psi(x,y) = \int\int_{-\infty}^{\infty} P(x,y)e^{\frac{ik}{z}(x_o x + y_o y)}dx_o dy_o$, and z = the distance of the limiting aperture $P(x,y)$ from the image, and * the convolution operation.

For the case when the Fresnel zone electric field scattered by the object is detected at distance z from the object, we have $$E_{Fn}(x_o,y_o) = \frac{1}{i\lambda z}e^{ikz}e^{(ik/2z)(x_o^2 + y_o^2)}\int\int_{-\infty}^{\infty} E_o(x,y)e^{(ik/2z)(x^2 + y^2)} \quad (2b)$$

$$e^{(-ik/z)(xx_o + yy_o)} dxdy$$

When the Fraunhofer field is detected at distance z from the object, $$E_F(x_o,y_o) = \frac{1}{i\lambda z} e^{ikz} e^{(ik/2z)(x_o^2 + y_o^2)} \iint_{-\infty}^{\infty} E_o(x,y) e^{\frac{-ik}{z}(xx_o + yy_o)} dxdy \quad (2c)$$

When the field is detected at a single point, the Fraunhofer case is equivalent to the case when the image pupil function P(x,y) is a delta function and the imaging system has an infinitely poor resolution. The Fresnel case is equivalent to the Fraunhofer case except for the fact that the point at which the field is detected is so close to the object that the quadratic phase factors across the object become important. In the sub-resolution imaging, these quadratic phase factors only contribute to a stretching of the image and their effect on the actual imaging process can be ignored. Thus only the sub-resolution imaging case for the Fraunhofer field will be considered and the equivalent calculations for the imaging case or the Fresnel field case can be made correspondingly. Since the system is spatially symmetric, interchanging $(\theta_x, x)$ with $(\theta_y, y)$ does not change the essential results. Thus in calculations where $\theta_y = 0$, the corresponding effect for $\theta_x = 0$, $\theta_y \pm 0$ can be easily determined. Also for most surfaces, the effect of h(x,y) is considered equal to zero and will only contribute a small random background noise which may be ignored.

Substituting Equation (1) into Equation (2c), the result is $$E_F(x_o,y_o) = \frac{e^{ikz}}{i\lambda z} e^{\frac{ik}{2z}(x_o^2 + y_o^2)} \iint_{-\infty}^{\infty} a(x,y) e^{ikx\sin\theta_x - \frac{ik}{z}(xx_o + yy_o)} dxdy \quad (3)$$

For the particular point P, at (0,0) on the plane II, Equation (3) reduces to $$E_F(0,0) = \frac{e^{ikz}}{i\lambda z} \iint_{-\infty}^{\infty} a(x,y) e^{ikx\sin\theta_x} dxdy. \quad (4)$$

Now evaluate the Fourier transform of $E_F(0,0)$ with respect to the wavenumber k. In general, the tunability for the wavelength of the illumination is over some certain region of $\Delta k$ wavenumbers band-width and at some center frequency $f_o$ which has the corresponding wavenumber $k_o$. Thus, in evaluating the Fourier transform of $E_F(0,0)$ as in (4), take into account this limited bandwidth available. This Fourier transform may, therefore, be written as $$e_F(0,0,\gamma_x) = \int_{-\infty}^{\infty} E_F(0,0) rect\left(\frac{k - k_o}{\Delta k}\right) e^{-ik\gamma_x} \frac{dk}{2\pi}, \quad (5)$$

where $\gamma_x$ is the image coordinate in the x dimension and $E_F(0,0)$ has been producted by rect $[(k-K_o)/\Delta k]$ to take into account the limited bandwidth available around the wavenumber $k_o$. Substituting (4) into (5), obtain the result $$e_F(0,0,\gamma_x) = \iiint_{-\infty}^{\infty} \frac{a(x,y)}{i\lambda z} e^{ik(x\sin\theta_x - \gamma_x + z)} rect\left(\frac{k - k_o}{\Delta k}\right) \frac{dk}{2\pi} dxdy \quad (6)$$

First evaluate Equation (6) with respect to k. Since the limits of the intergration have been set over the region $k_o \pm \Delta k/2$ by the rect $[(k-k_o)/\Delta k]$ in the integral, and since the phase term $$e^{ik(x\sin\theta_x + \gamma_x - z)}$$

is varying at a much greater rate than the $1/\lambda$ term, the variation in the $1/\lambda$ term is ignored in evaluating the integral over k. This gives the result $$e_F(o,o,\gamma_x) = \iint_{-\infty}^{\infty} \frac{a(x,y)}{i\lambda z} e^{ik_o(x\sin\theta_x - \gamma_x + z)} \frac{\Delta k}{2\pi} \quad (7)$$

$$sinc\left[\frac{\Delta k}{2\pi}(\gamma_x - z - x\sin\theta_x)\right] dxdy,$$

where sinc (x) is defined as $\sin\pi x/\pi x$.

Note that Equation (7) is in the form of a convolution and can be written explicitly as $$e_F(0,0,\gamma_x \sin\theta_x) = \quad (8)$$

$$a(x,y) * \frac{e^{-ik_o(x\sin\theta_x + z)}}{i\lambda z} \frac{\Delta k}{2\pi} sinc\left[\frac{\Delta k}{2\pi}(z + x\sin\theta_x)\right]$$

Equation (8) expresses the Fourier transform of the electric field with respect to the wavenumber in the far field region of an object and shows that it is the electric field transmitted by the object convolved with a resolution factor related to the bandwidth of the frequency variation available. The width of this resolution factor in the x-dimension is $2\pi/\Delta k \sin\theta_x$ where $\theta_x$ is the angle of illumination employed. If the wavelength span of 1000 Å is employed, the illumination angle taken to be 60°, and the center wavelength taken to be 5000 Å, we obtain the resolution cell size in the x dimension as 2.9 μm. In the y-dimension the resolution is very poor, since the image electric field is the integrated field exiting the object plane over the y-axis.

It is possible to proceed to perform a similar calculation for the Fourier transform of the field detected at P with respect to the angle of illumination when the wavelength of illumination is not varied but the incident angle $\theta_x$ is changed by the span $\Delta\theta_x$ around $\theta_{xo}$. The pupil function describing this angular bandwidth employed is assumed to be rect $[(\sin\theta_x - \sin\theta_{xo})/\Delta(\sin\theta_x)]$ where $\Delta(\sin\theta_x)/2 \approx \sin(\theta_x + \Delta\theta_x/2) - \sin\theta_x$. The Fourier transform of $E_F(0,0)$ is defined, using the same notation used in Equation (6) as follows $$e_F(0,0,\rho_x) = \int_{-\infty}^{\infty} E_F(0,0) \text{rect}\left(\frac{\sin\theta_x - \sin\theta_{xo}}{\Delta(\sin\theta_x)}\right) e^{-i2\pi(\sin\theta_x)\rho_x} d(\sin\theta_x) \quad (9)$$

Substituting Equation (4) into Equation (9), evaluating, and simplifying the result, the function $e_F(o,o,\rho_x)$ is found to be given by the convolution $$e_F\left(o,o,\frac{\rho_x}{\lambda}\right) = a(x,y) * \frac{e^{ikz - i2\pi\frac{x}{\lambda}\sin\theta_{xo}}}{i\lambda z} \text{sinc}\left[\Delta(\sin\theta_x)\frac{x}{\lambda}\right](\Delta\sin\theta_x) \quad (10)$$

The Fourier transform of the electric field detected at point P with respect to the angle of incidence is thus obtained as the convolution of the electric field exiting the object plane I with the function $\{(e^{ikz}/i\lambda z)e^{-i2\pi(x/\lambda)\sin\theta_{xo}(\Delta \sin \theta_x)} \text{sinc}[\Delta(\sin\theta_x)x/\lambda]\}$ which has the width given by $\lambda/\Delta(\sin\theta_x)$. Thus, the resolution of the image obtained in this fashion, for an angular width of $\pm 5°$ centered around normal incidence, and for an incidence wavelength of 5000 Å, is 2.9 μm in the x-dimension. Again, the resolution in the y-dimension is very poor since the field is integrated over the whole y-axis.

It is possible to obtain a high resolution in both dimensions by using a combination of both wavelength and angular variation monitoring. Consider the case when the illumination angle in the direction of the x axis is $\theta_x$, and the angle that the y component of the k vector for the illumination makes with the normal to the object is $\theta_y$, and assume that $\theta_x >> \theta_y$. In computing the Fourier transform of the electric field with respect to the variation in the wavelength of the illumination and in the angle $\theta_y$, the electric field exiting plane I is given by $$E_o(x,y) = a(x,y)e^{ikx \sin\theta_x + iky \sin\theta_y}, \quad (11)$$

and the corresponding electric field detected at point P is written as $$E_F(0,0) = \frac{e^{ikz}}{i\lambda z} \iint_{-\infty}^{\infty} a(x,y)e^{ikx\sin\theta_x + iky\sin\theta_y} dxdy \quad (12)$$

Recording the value of $E_F(0,0)$ while the incident wavevector is varied from $k_o - \Delta k/2$ to $k_o + \Delta k/2$ and the angle of incidence in the y direction from $-\Delta\theta_y/2$ to $+\Delta\theta_y/2$. yields the function $E_F(0,0)$ rect $[(k-k_o)/\Delta k]$ rect $[\sin\theta_y/\Delta(\sin\theta_y)]$.

Now taking the two-dimensional transform of this function as defined by $$e_F(\gamma_x,\rho_y) = \quad (13)$$

$$\iint_{-\infty}^{\infty} E_F(0,0) \text{rect}\left(\frac{k-k_o}{\Delta k}\right) \text{rect}\left(\frac{\sin\theta_y}{\Delta(\sin\theta_y)}\right)$$

$$e^{-ik\gamma_x - i2\pi(\sin\theta_y)\rho_y} d\left(\frac{k}{2\pi}\right) d(\sin\theta_y)$$

and substituting Equation (12) into Equation (13) the following equation is obtained:

$$e_F(\gamma_x,\rho_y) = \iiiint_{-\infty}^{\infty} \frac{a(x,y)}{i\lambda z} e^{ik(x\sin\theta_x + y\sin\theta_y - \gamma_x + z) - i2\pi(\sin\theta_y)\rho_y} \quad (14)$$

$$\text{rect}\left(\frac{k-k_o}{\Delta k}\right) \text{rect}\left(\frac{\sin\theta_y}{\Delta(\sin\theta_y)}\right) d\left(\frac{k}{2\pi}\right) d(\sin\theta_y) dxdy$$

Evaluating Equation (14) over only the k variable, neglecting the $1/\lambda$ variation compared to the phase term over the region $k_o \pm \Delta k$, yields $$e_F(\gamma_x,\rho_y) = \iiint_{-\infty}^{\infty} \frac{a(x,y)}{i\lambda z} e^{ik_o(x\sin\theta_x + y\sin\theta_y - \gamma_x + z) - i2\pi(\sin\theta_y)\rho_y} \quad (15)$$

$$\left(\frac{\Delta k}{2\pi}\right) \text{rect}\left(\frac{\sin\theta_y}{\Delta(\sin\theta_y)}\right) \text{sinc}\left[\frac{\Delta k}{2\pi}(\gamma_x - x\sin\theta_x - y\sin\theta_y - z)\right] d(\sin\theta_y) dxdy$$

Since it is assumed that $\theta_{yo} = 0$, and that the variation of $\theta_y$ is so small that $\Delta\theta_y << \theta_x$, it is possible to ignore y sin $\theta_y$ compared to the x sin $\theta_x$ term. The sinc $[\Delta k/2\pi(\gamma_x - x \sin \theta_x - y \sin \theta_y - z)]$ can be approximated by sinc $[\Delta k/2\pi(\gamma_x - x \sin \theta_x - z)]$. Using this approximation to evaluate Equation (15) yields $$e_F(\gamma_x,\rho_y) \simeq \quad (16)$$

$$\iint_{-\infty}^{\infty} dxdy \frac{a(x,y)}{i\lambda z} \left[\frac{\Delta k}{2\pi} \Delta(\sin\theta_y)\right] e^{ik_o(x\sin\theta_x - \gamma_x + z)}$$

$$\text{sinc}\left[\frac{\Delta k}{2\pi}(\gamma_x - x\sin\theta_x - z)\right] \text{sinc}\left[\Delta(\sin\theta_y)\left(\rho_y - \frac{x}{\lambda}\right)\right]$$

which can be rewritten as the convolution $$e_F\left(\gamma_x \sin\theta_x, \frac{\rho_y}{\gamma}\right) = a(x,y) * e^{-ik_o(x\sin\theta_x + z)} \left[\frac{\Delta k}{2\pi} \Delta(\sin\theta_y)\right] \quad (17)$$

$$\text{sinc}\left[\frac{\Delta k}{2\pi}(x\sin\theta_x - z)\right] \text{sinc}\left[\Delta(\sin\theta_y)\frac{x}{\lambda}\right].$$

Thus, provided $\theta_y + \Delta\theta_y << \theta_x$, the resulting two-dimensional Fourier transform with respect to the wavenumber k and the angle of illumination variation $\theta_y$, would give the electric field transmitted by the object 10 convolved with the impulse response factors for the x and y dimensions, the widths of which are $1/\Delta k \sin \theta_x$ and $\lambda/\Delta(\sin \theta_y)$ in the x and y dimensions respectively. Thus, as in previous considerations, for $\lambda = 5000$ Å, $\Delta\lambda = 1000$ Å, $\theta_x = 60°$, $\theta_y = 0° \pm 5°$ this would correspond to a resolution of 2.9 μm in the x and y dimensions respectively. Consider now the scanning application where high resolution is obtained in one dimension and the object translated with respect to the illumination in the other direction. In order to do this, assume that the illumination spot on the object is given by the function rect $(x/2L_x)$ rect $(y-\alpha/2L_y)$ which is a rectangle of width $2L_x$, $2L_y$ in the x and y dimensions respectively and centered at $(0, \alpha)$. While the wavelength or angular variation is used to obtain the high resolution along the x dimension the object is translated with respect to the illumination in the y direction, i.e., $\alpha$ is varied. For any particular value of $\alpha$, use (7) to provide the Fourier transform with respect to the wavenumber of the electric field detected at the point P. This is given by, for the object transmittance now given by $$\left\{ a(x,y)e^{ikx\sin\theta_x} rect\left(\frac{x}{2L_x}\right) rect\left(\frac{y-\alpha}{2L_y}\right) \right\} \text{ as} \quad (18)$$

$$e_F(0,0,\gamma_x) = \iint_{-\infty}^{\infty} \int_{\alpha-L_y}^{\alpha+L_y} a(x,y) rect\left(\frac{x}{2L_x}\right) \frac{e^{ik_o(x\sin\theta_x - \gamma + z)}}{i\lambda z}\left(\frac{\Delta k}{2\pi}\right)$$

$$\text{sinc}\left[\frac{\Delta k}{2\pi}(\gamma_x - z - x\sin\theta_x)\right] dx dy.$$

Differentiating (18) with respect to $\alpha$ and rearranging terms, we have the result, $$a(x,\alpha) rect\left(\frac{x}{2L_x}\right) * \frac{e^{-ik_o(\sin\theta_x + z)}}{i\lambda z}\left(\frac{\Delta k}{2\pi}\right) \text{sinc}\left[\frac{\Delta k}{2\pi}(z + x\sin\theta_x)\right] \delta(\alpha) = \quad (19)$$

$$\frac{de_F}{d\alpha}(o,o,\gamma_x) + a(x,\alpha - 2L_y) rect\left(\frac{x}{2L_x}\right) * e^{ik_o(\sin\theta_x + z)}$$

$$\left(\frac{\Delta k}{2\pi}\right) \text{sinc}\left[\frac{\Delta k}{2\pi}(z + x\sin\theta_x)\right] \delta(\alpha)$$

From Equation (19) it is evident that, provided $a(x,y)$ is known for the region $0<y<2L_y$, the function $a(x,y)$ may be determined from Equation (21) for all values of y for any given $L_y$. Thus, for scanning applications, while high resolution may be obtained in one dimension by varying the wavelength or angle of illumination, the other dimension may be resolved if the object is translated with respect to this axis and if the object transmittance is known in the initial spot size region.

The electric field at the point $(\beta,0)$ also depends upon the distance z of the detector plane from the object. Evaluating the integral $$\int_{-\infty}^{\infty} E_F(\beta,o) \, rect \, \frac{1/z - 1/z_o}{\Delta(1/z)} \, e^{-i2\pi\eta(1/z)} d(1/z),$$

for $z_o$ a mean distance, $E_F(\beta,0)$ as defined in Equation (3) and $\theta_x=0$, $\beta/z>>1$ $$e_F(\beta,o,\frac{\eta\beta k}{2\pi}) = a(x,y) * \frac{e^{-ik/z_o(x\beta - \frac{\beta^2}{z})}}{i\lambda z_o}(\Delta(1/z))\text{sinc}[\Delta(1/z)\beta/\lambda x - \beta/2)] \quad (20)$$

While Equations (3) to (20) have been evaluated with the assumption that the spatial effect of the object phase transmittance $h(x,y)$ is zero, consider now the case when $\theta_x=\theta_y=0$, $h(x,y)\pm 0$, and the integral (5) is evaluated. The result is $$e_F(o,o,\gamma_x) = \iint_{-\infty}^{\infty} a(x,y)e^{-ik_o(\gamma - 2h(x,y) - z)} \text{sinc}[\Delta k/2\pi(\gamma_x - 2h(x,y) - z)] \quad (21)$$

For $\Delta k$ large, $e_F(\gamma_x)$ has non-zero values only for $\gamma=2h$. This point may be clarified further by assuming that there is only one phase scatterer on the object and the function $h(x)$ is described by $h(x)=h_o\text{rect}(x-x_o)/w_o$ where $(x_o,o)$ is the position of this scatterer of height $h_o$ and width $w_o$.

The function $e_F(\gamma_x)$ will have a non-negligible value only at $\gamma=2h_o$ and the magnitude of this value will be $$\int_{-\infty}^{\infty} a(x) rect(\frac{x-x_o}{w_o}) dx.$$

For a multitude of scatterers of height $h_r$, width $w_r$ on the object, the function $e_F(\gamma_x)$ will be a series of peaks at $\gamma_x=2h_r$ and the heights of these peaks will be equal to $$\int_{-\infty}^{\infty} a(x) rect(\frac{x-x_o}{W_r}) dx.$$

For a continuous function describing $h(x)$ the function $e_F(\gamma_x)$ will be some continuous function for various values of $\gamma_x$ depending on the fraction of the total function that has the height equal to $\gamma_x$ produced by the values of $a(x,y)$ at those particular $\gamma=2h$. By placing a mask, with step function heights of equal widths and different values placed at different spatial points, in contact with the object $a(x,y)$, the values of $a(x,y)$ can be sampled by measuring the Fourier transform of the electric field detected versus wavelength and noting that the position of the peaks on this transform correspond to the heights on the phase mask and the value of these peaks to the value of a(x,y) at the corresponding points on the mask.

While Equations (8), (10), (17) and (19) have been calculated for the case when point P is at (0,0), it is interesting to note the effect of making the imaging measurement at some point other than the origin. To illustrate, consider the derivation of Equations (7) and (10) using the values $x_o = -\beta$ and $y_o = 0$ in (3). Proceeding with similar steps leading from Equations (3) to (8), it is found that the Fourier transform with respect to the wavenumber of the field detected at $(-\beta, 0)$ is given by $$e_F\left(0,0,\left(\sin\theta_x + \frac{\beta}{z}\right)\right) = a(x,y) \cdot e^{-ik_o\left[x\left(\sin\theta_x + \frac{\beta}{z}\right) + \left(z + \frac{\beta^2}{2z}\right)\right]} \quad (22)$$

$$\left(\frac{\Delta k}{2\pi}\right)\text{sinc}\left[\frac{\Delta k}{2\pi}x\left(\sin\theta_x + \frac{\beta}{z}\right) + \left(z + \frac{\beta^2}{2z}\right)\right]$$

Similarly the equivalent of Equation (10) becomes $$e_F(0,0,\frac{\rho x}{\lambda}) = \quad (23)$$

$$a(x,y) \cdot e^{-ik\left(z + \frac{\beta^2}{2z} + \frac{x\beta}{z}\right) - i2\pi\left(\frac{x}{\lambda}\right)\sin\theta xo}$$

$$\Delta(\sin\theta_x) \cdot \text{sinc}\left[\Delta(\sin\theta_x)\frac{x}{\lambda}\right]$$

Note from Equation (22) that detecting the wavelength dependent electric field at a point other than the origin simply shifts the image by $\beta^2/2z$ with respect to the image formed from the field at the origin. Also the resolution cell size of the image has now changed from $2\pi/k \sin \theta_x$ to $2\pi/k(\sin\theta_x + \beta/z)$. Thus, even if the illumination angle is zero, i.e., if $\sin \theta_x = 0$, detection of the electric field would still produce some image, the resolution of which is proportional to the angle subtended by the detector, $\beta/z$, to the object. This is related to the resolution for a lens of aperture $\beta$. From Equation (23), the off center measurement of the electric field, while the angle of illumination is changed, does not perturb the measurement except to change the phase factor involved with the impulse response function.

Equation (22) is also applicable, if $\theta_x = 0$, when any of the standard interferometric techniques to make incoherent holograms are used; and field at the point $(\beta, 0)$ is detected with respect to wavelength. In the case when a band of frequencies illuminates an object at the same time, the electric field at a point on the far-field region detected as a function of time is the image electric field given by Equation (8) since the time and frequency variables are Fourier transform variables with respect to each other.

Given for some function a(x,y), the operation $g(x_1,y_1) = \int\int a(x,y)m(x,y;x_1,y_1)dxdy$, the function $a(x_o,y_o)$ may be retrieved from $g(x_1,y_1)$ by using the operation $\int\int g(x_1,y_1)m^{-1}(x,y,\gamma_x,\gamma_y)dx_1dy_1$ where the function $m^{-1}(x,y;\gamma_x,\gamma_y)$ is defined by $\int\int m(x,y;x_1,y_1)m^{-1}(x_1,y_1;\gamma_x,\gamma_y)dx_1dy_1 = \delta(x-\gamma_x)\delta(y-\gamma_y)$. The function m in the situations described in the subresolution system corresponds to $e^{i2\pi x x_1}$ and $m^{-1}$ to $e^{-i2\pi\gamma x x_1}$ where $x_1$ is $1/\lambda$ when wavelength variation is used for the imaging, $\sin \theta_x$ or $\sin \theta_y$ when angular variation is used. Alternately the object a(x,y) can be written as a matrix in which case m is a matrix and $m^{-1}$ is an inverse matrix.

In the practical implementation of the theory involved in the analysis here, a coherent illumination tunable in wavelength or angular direction and a method for detecting the far field electrical field scattered by the object, such as by a heterodyne measurement, would be sufficient to provide the necessary information to produce a high resolution image of the object of interest. For optical wavelengths, an electro-optically tunable dye laser or a laser in combination with an acoustic-optic or electro-optic deflector may be used to produce rapid tuning of the wavelength and angle of illumination, while the electric field at point P may be detected by using a local oscillator to provide the coherent detection scheme.

The Fourier transform operation to reduce this signal to an image may be performed by a digital fast Fourier Transform Processor. An alternate technique would be to amplitude and phase modulate the output of a laser by an electro-optic cell with the signal and detect this, using heterodyne detection, with an integrating time longer than the signal duration. (The local oscillator may be a tunable laser.) The detector output obtained as a function of the frequency difference of the local oscillator and the signal laser would be the desired Fourier transform.

Equations (8), (10) and (17) are the results for the Fourier transform of the electric field, with respect to the angle or wavelength of illumination incident on some object at a point in the far field region of the object. They represent the image electric field of the object itself, the resolution of this image depending upon the angular and wavelength bandwidth through which the illumination can be tuned.

The foregoing discussion of the system of FIG. 1 in different modes has been generally in reference to the system without the optional lens $L_1$, particularly in respect to the geometry of FIG. 2 and the discussion relation thereto which followed. For the corresponding geometry in the case of imaging with a lens, and a discussion of the present invention as it applied to that case, see a paper by the present inventor titled Sub-Resolution Imaging: Use of Wavelength and Angular Diversity Techniques published in Applied Physics Letters, Vol. 28, No. 8, at pages 451 to 453 (Apr. 15, 1976). That paper also illustrates the applicability of the invention to applications employing reflected wave field detection.

In summary, the Fourier transform of the wave field is obtained by a detector at a point on the image plane of an object as the angle, wavelength or distance from the object of the coherent wave source is varied to provide through an inverse Fourier transform calculated by a processor enhanced image data of the object which the resolution cell centered at the corresponding point on the object. Alternatively, only the intensity of the wave field may be detected as a Fourier spectrum at a point on the image plane, and the Fourier transform of the intensity is the autocorrelation of the transform of the wave field variation with wavelength. Thus, it is possible to use the output of the detector without heterodyne detection in order to obtain only intensity (wave amplitude) data for a Fourier spectrum of the image (i.e., the square of intensity of the Fourier transform that would otherwise be obtained by heterodyne detection), or to use the output of the detector with heterodyne detection to obtain both the amplitude and phase data of the image for a Fourier transform. This is so because the output of the heterodyne detector is the Fourier transform of the object at a point on the image plane, so that if the Fourier transform processor is not used, the result is a spatial Fourier transform of the object; and if the processor is used to obtain the inverse Fourier transform, a wave field image at a point on the image plane of an object is produced. Upon squaring that wave field image, an intensity image is produced for display, as on a cathode ray tube display unit. In other words, the squarer provides the square of intensity in the image wave field, and eliminates the phase data. Also a system without a processor may be of interest in some applications since the detector may provide the Fourier transform of the object if both modulation and heterodyne detection is used, as described hereinbefore, and the Fourier spectrum if only intensity detection is used, i.e., if elements 25, 31, 32 and 30 are omitted, as just noted. While the preferred embodiments described herein have been for the case of detecting radiation through the object, it is obvious that they can be modified for the case of reflection from the object. Consequently it is intended that the claims cover such modifications and variations.

What is claimed is:

1. A method of enhancing the resolution of a system for imaging an object at a plane comprised of the steps of radiating said object with a plane wave field at an angle with respect to an axis normal to the object and in the direction to the object from a coherent source variable in a parameter selected from frequency, angle, or distance to the object, to achieve phase variable radiation of the object, detecting the wave field or intensity of radiation at a selected point in said plane as a function of the variable parameter selected while said selected parameter is being varied, and computing a Fourier transform of the detected wave field or intensity at said selected point with respect to the variable parameter.

2. A method as defined in claim 1 wherein said selected point of the imaging system includes the whole object.

3. A method as defined in claim 1 wherein said selected point of the imaging system includes a single cell of the whole image and said cell includes an area of the image determined by the resolution of the imaging system.

4. A method for enhancing the creation of an image at a plane comprised of the steps of radiating an object with a plane wave field from a coherent source at a selected angle $\theta_x$ with respect to a Z axis normal to the object and in the direction to the object from said source in a plane defined by an X axis, where said X and said Z axes are perpendicular and perpendicular to a Y axis to define an X–Y plane parallel to said object and an X–Z plane of said angle, $\theta_x$, varying the spatial phase relationship of the radiating wave field by varying at least one parameter selected from the wave field frequency and the selected angle of radiation, detecting the wave field of radiation at said selected point as a function of the variable parameter selected while said selected angle $\theta_x$ is being varied, and computing a Fourier transform of the detected wave field or intensity of a selected point in said plane with respect to the variable parameter for synthesis of a high resolution image at said point.

5. A method as defined in claim 4 wherein said Fourier transform is of the image of the whole object along a line in the plane of the angle.

6. A method as defined in claim 4 wherein said Fourier transform is of a cell of the image, and said cell includes an area of the object determined by the resolution of the imaging system.

7. A method as defined in claim 4 wherein both the radiation frequency and angle are varied, the further limitation of fixing the angle of radiation in the plane of one axis normal to an axis in the direction to the object and limiting the variation in the angle in the plane of another axis normal to said one axis and the axis in the direction of the object over a small range while varying the frequency, and including the computation of Fourier transforms with respect to both the frequency and angle variations to obtain an image of the object in two dimensions.

8. A method as defined in claim 4 wherein only the angle of radiation is varied, first in a plane of one axis normal to an axis in the direction of the object, and then in a plane of another axis normal to said one axis and the axis in the direction of the object to obtain an image of the object in two dimensions.

9. A method as defined in claim 4 wherein the Fourier transform computation is achieved by modulating the amplitude and phase of radiation from said coherent source with a periodic signal and, using heterodyne detection with an integrating time longer than the signal period, objecting a signal as a function of the frequency difference of the coherent source and the local oscillator that is the desired Fourier transform.

10. A method for enhancing the creation of an image in an imaging system comprised of the steps of radiating an object with a plane wave field from a coherent source at a selected angle $\theta_x$ with respect to a Z axis normal to the object and the direction to the object from said source in a plane defined by an X axis, where said X and said Z axes are perpendicular and perpendicular to a Y axis to define an X–Y plane parallel to said object and an X–Z plane of said angle, $\theta_x$, varying the distance of the object from the source in order to obtain high frequency components of an area at a selected point in the image for Fourier synthesis, detecting the wave field or intensity at said selected point as a function of the variable distance while said variable distance is being varied, and computing a Fourier transform of the detected wave field or intensity of said selected point with respect to the variable distance for synthesis of a high resolution image at said point.

11. A method as defined in claim 10 wherein said Fourier transform is of the whole object along a line in the plane of the angle.

12. A method as defined in claim 10 wherein said Fourier transform is of a cell, and said cell includes an area of the object determined by the resolution of the imaging system.

13. Apparatus for enhancing the resolution of a system for creating an object at a plane comprising
means for radiating an object with a plane wave field from a coherent source variable in a parameter selected from frequency and angle of illumination to the object to achieve phase variable radiation in order to obtain high frequency components of an area at a selected point in said plane for Fourier synthesis,
means for detecting the wave field or intensity at said selected point as a function of the variable parameter selected while said selected parameter is varied, and
means for computing a Fourier transform of the detected electric field or intensity of said selected point with respect to the variable parameter.

14. Apparatus as defined in claim 13 wherein said selected point of the imaging system includes the whole object.

15. Apparatus as defined in claim 13 wherein selected point of the imaging system includes a single cell of the whole image and said cell includes an area of the image determined by the resolution of the imaging system.

16. Apparatus for enhancing the creation of an image in an imaging system comprising
means for radiating an object with radiation from a coherent source at a selected angle $\theta_x$ with respect to a Z axis normal to the object and in the direction to the object from said source in a plane defined by an X axis, where said X and said Z axes are perpendicular and perpendicular to a Y axis to define an X-Y plane parallel to said object and an X-Z plane of said angle, $\theta_x$,
means for varying the spatial phase relationship of the illuminating radiation by varying at least one parameter selected from the radiation frequency and the selected angle in order to obtain high frequency components of an area at a selected point in the image for Fourier synthesis,
means for detecting the wave field or intensity of radiation at said selected point as a function of the variable parameter selected while said selected parameter is varied, and
means for computing a Fourier transform of the detected electric field or intensity of said selected point with respect to the variable parameter for synthesis of a high resolution image at said point.

17. Apparatus as defined in claim 16 wherein said Fourier transform is of the image of the whole object along a line in the plane of the angle.

18. Apparatus as defined in claim 16 wherein said Fourier transform is of a cell of the image, and said cell includes an area of the image determined by the resolution of the imaging system.

19. Apparatus as defined in claim 16 wherein both the radiation frequency and angle are varied, the combination including means for fixing the angle in the plane of one axis normal to an axis in the direction to the object and limiting the variation in the angle in the plane of another axis normal to said one axis and the axis in the direction of the object over a small range while varying the frequency and including means for the computation of Fourier transforms with respect to both the frequency and angle variations to obtain an image of the object in two dimensions.

20. Apparatus as defined in claim 19 wherein only the angle is varied, first in a plane of one axis normal to an axis in the direction of the object, and then in a plane of another axis normal to said one axis and the axis in the direction of the object to obtain an image of the object in two dimensions.

21. Apparatus for enhancing the creation of an image in an imaging system comprised of
means for illuminating an object with radiation from a coherent light source at a selected angle $\theta_x$ with respect to a Z axis normal to the object and in the direction to the object from said source in a plane defined by an X axis, where said X and said Z axes are perpendicular and perpendicular to a Y axis to define an X-Y plane parallel to said object and an X-Z plane of said angle, $\theta_x$,
means for varying the distance of the object from the source in order to obtain high frequency components of an area at a selected point for Fourier synthesis,
means for detecting the electric field or intensity of illumination at said selected point as a function of the variable distance while said variable distance is varied, and
means for computing a Fourier transform of the detected electric field or intensity of said selected point with respect to the variable distance.

22. Apparatus as defined in claim 21 wherein said Fourier transform is of the image of the whole object along a line in the plane of the illuminating angle.

23. Apparatus as defined in claim 21 wherein said Fourier transform is of a cell of the image, and said cell includes an area of the image determined by the resolution of the imaging system.

24. A method of enhancing the resolution of image data comprised of the steps of
radiating an object with a plane wave field from a coherent source variable in at least one parameter selected from frequency, angle of radiation and distance to the object to effectively achieve phase variable radiation of the object in order to obtain high frequency components of an area at a selected detection point, and
detecting the intensity of radiation at said selected point as a function of the variable parameter selected while said selected parameter is varied to obtain a spatial Fourier spectrum of the detected intensity at said selected point with respect to the variable parameter for autocorrelation data of the image at said point.

25. A method as defined in claim 24 wherein said selected detection point of the imaging system includes the whole object.

26. A method as defined in claim 24 wherein said selected detection point of the imaging system includes a single cell of the whole image and said cell includes an area of the image determined by the resolution of the imaging system.

27. A method of enhancing the resolution of image data comprised of the steps of
radiating an object with radiation from a coherent source variable in at least one parameter selected from frequency, angle and distance to the object to achieve phase variable radiation of the object in order to obtain high frequency components of an area at a selected point, and detecting the intensity of radiation at said selected point as a function of the variable parameter selected while said selected parameter is varied by using a heterodyne detector in order to obtain a spatial Fourier transform.

28. A method as defined in claim 27 wherein said selected point of the imaging system includes the whole object.

29. A method as defined in claim 27 wherein said selected point of the imaging system includes a single cell of the whole image and said cell includes an area of the image determined by the resolution of the imaging system.

30. A method of enhancing the resolution of a point on an image plane of an imaging system comprised of the steps of radiating an object with a wave field variable in a parameter selected to vary the spatial distribution of the wave field at a selected region on the object corresponding to a point on said image plane, detecting the value of the wave field at said corresponding image point as a function of the variable parameter selected while said selected parameter is varied, and determining the function which, when correlated with a wave field detected at said corresponding image point as a function of the variable selected, results in a response corresponding to a wave impulse at a position corresponding to the location of said point on said object and correlating the wave field at the image point with this function.

* * * * *